Figure 1:
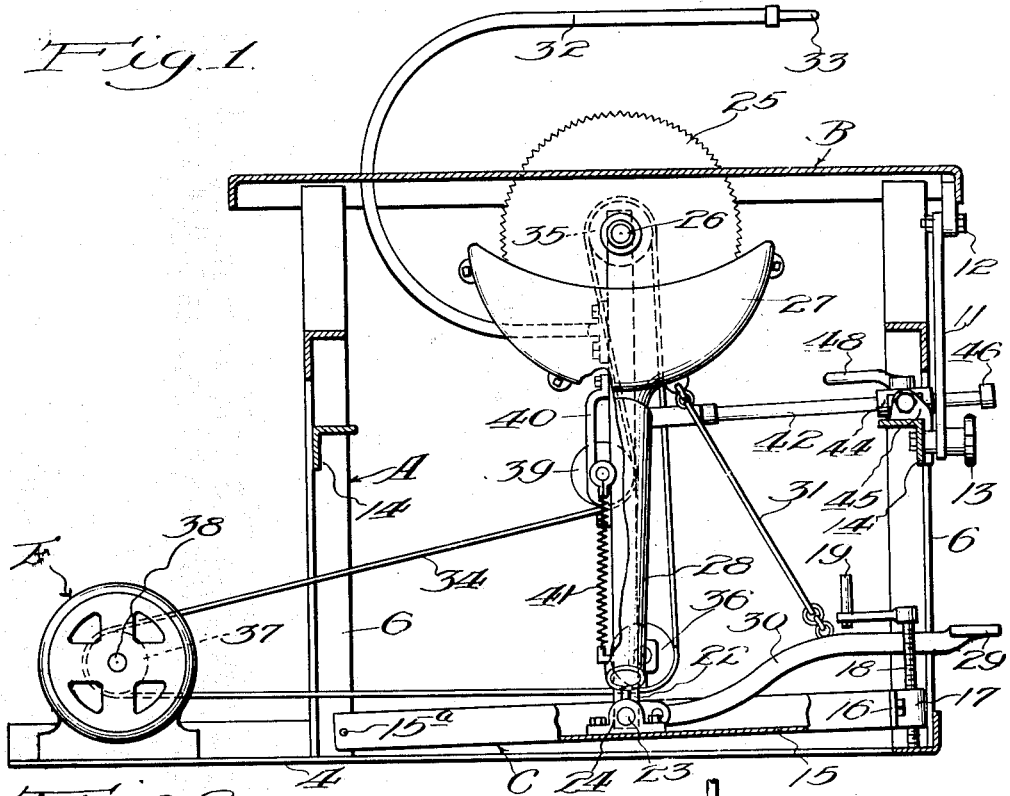

May 25, 1926.

F. G. WALKER

SAWING MACHINE

Filed April 16, 1925

1,586,494

Inventor:
Fred G. Walker,

Patented May 25, 1926.

1,586,494

UNITED STATES PATENT OFFICE.

FRED G. WALKER, OF CHICAGO, ILLINOIS, ASSIGNOR TO JONES SUPERIOR MACHINE COMPANY, OF CHICAGO, ILLINOIS, A CORPORATION OF ILLINOIS.

SAWING MACHINE.

Application filed April 16, 1925. Serial No. 23,556.

This invention relates to a sawing machine such, for example, as may be used advantageously in cutting wood, and is particularly concerned with certain improvements in the combination and arrangement of its several parts by which both the saw and table units may be adjusted to produce desired results in the treatment of the work.

With machines of the kind heretofore known, it has been impossible to obtain an adjustment of the operating parts such that certain desired cuts in the work could be produced. For example, the beams entering into the construction of a gable roof, particularly where dormer windows are provided, require a cutting of their ends in directions which are oblique to both the sides and edges of the beams. Such a double oblique cut may not be obtained in a single operation with sawing machines of the present time, so far as I am aware. It is to meet special conditions such as the one just suggested, and also to provide a sawing machine having other improved features by which it is rendered easily and accurately adjustable, that my invention is designed.

Figure 2:
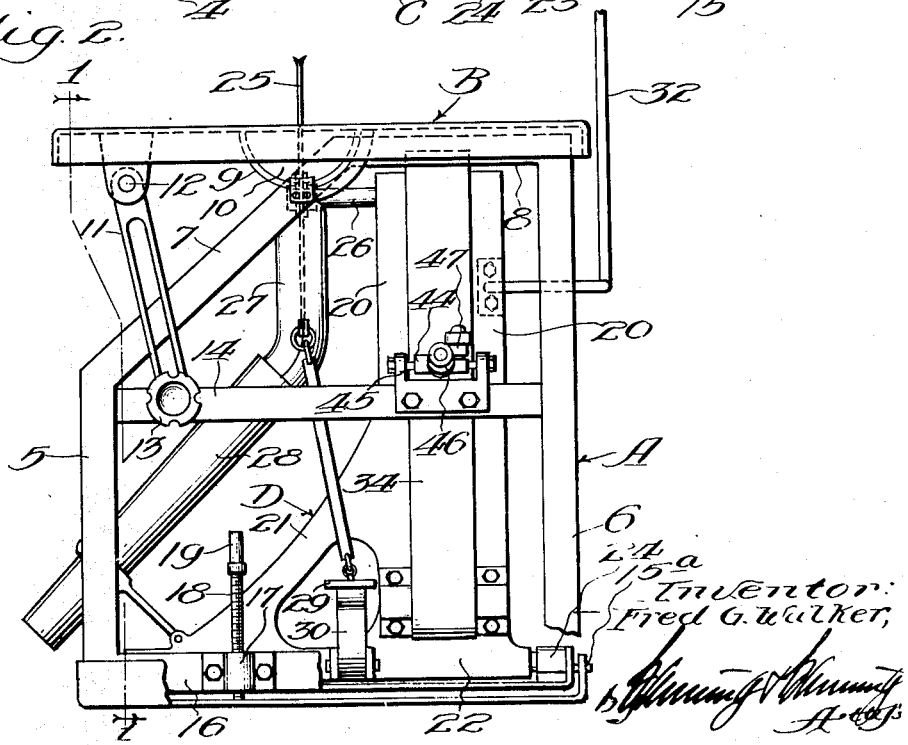

In the drawing:

Figure 1 is a longitudinal section through the machine taken approximately on line 1—1 of Fig. 2; and Fig. 2 is an elevation looking toward the front end thereof.

As shown, the machine of my invention comprises a framework A which includes a base 4 and front and rear standards 5 and 6 which combine to form a support for a table B. The standards 5 which lie to one side of the machine have obliquely disposed upper portions 7 which incline toward the vertical standards 6, and are joined to horizontal top rails 8 which connect also with the upper extremities of the standards 6.

The table mountings which are carried by the rails preferably include two arc-shaped channelled guideways 9 in each of which is slidably received a segment 10, one made fast to the table adjacent opposite ends thereof. The table may accordingly be disposed in a horizontal position, as shown in Fig. 2, or be tilted into a position approaching parallelism with the oblique portions 7 of the standards 5. Means for securing the table in any desired position of adjustment may take the form of a slotted link 11 pivotally connected as at 12 to the table near one edge thereof, a hand screw 13 being entered through the link for threaded engagement within a cross brace 14 which extends between two of the standards 5 and 6.

Associated with a table of this general kind is the saw unit which is mounted upon a cradle C. As shown this cradle is in the form of a frame comprising two parallel side rails 15 each pivoted at one end, as at 15ª, to one of the standards 5 and 6 adjacent the base 4. Extending between the opposite ends of these rails is a connecting rail 16 which lies adjacent the front side of the table. Associated with this connecting rail is a threaded bearing 17 in which is received a screw shaft 18 having an operating handle 19 therefor. The lower end of the shaft bears against the machine base so as to support the connecting rail at a desired elevation thereabove. Manifestly by rotating this screw shaft, the entire cradle may be raised and lowered about its pivotal axis 15ª.

I have mounted on the cradle a swinging support D which may consist of a pair of spaced uprights 20, together with an obliquely extending brace 21, all joined at their lower ends to a common arm 22 having at its ends trunnions 23 which are received within bearings 24 carried by the two side rails 15 of the cradle. The support thus mounted is free to oscillate upon the cradle, and to be raised or lowered with adjustments of the latter to meet any particular conditions.

The saw 25 may be of the conventional circular type and is mounted fast upon one end of a shaft 26 which is carried within suitable bearings at the upper ends of the two uprights 20. A guard 27 which is secured to the support D surrounds the lower portion of the saw and connects with a duct 28 which leads downwardly, as shown. The saw, together with its guard, lies to one side of the two uprights, but is adequately supported thereby so as to be oscillated with movement of the support about its axis 15ª. These movements may be accomplished with the aid of a pedal 29 fixed to one end of an arm 30 which is joined to the support near its base, a link 31 also connecting this arm with an upper portion of the support so as to assure oscillation thereof in one direction when pressure is placed upon the pedal. A supplementary manual control may also be provided, as shown, this consisting preferably of a rod 32 which extends from the support to present an operating handle 33 within convenient reach of the attendant.

Means for rotating the saw are provided in a belt 34 which passes over a pulley 35 mounted fast upon the shaft 26 between the two uprights 20, also around an idler pulley 36 which is carried between these uprights near their lower ends. The belt is further carried around a second fixed pulley 37 connected fast with a power shaft 38 to which rotation is imparted as by means of a motor E. A second idler pulley 39 is also mounted for vertical sliding movement in a guideway 40 which is attached to the support D intermediately of the two pulleys 35 and 36. The tendency of this shiftable idler is to hold the belt taut at all times, regardless of the adjusted position of the support or cradle. To further assure tightening of the belt, a spring 41 may connect the idler pulley 39 with a fixed part of the machine, preferably the lower end of the support.

It will be understood that the saw extends through an elongated V-slot in the table, this slot being aligned with its axis of tilting. Downward pull on the idler 39 tends at all times to hold the support over in a position which raises the pedal so that when pressure is withdrawn therefrom the support will be restored to an initial position which is adjustable by means as follows:

A rod 42 having a pivotal connection with the support extends in a generally horizontal direction toward the front end of the machine, and passes through a split block 44 which is swingingly supported in a mounting 45. A collar or nut 46 which is adjustably carried near the outer end of this rod is adapted to engage with the block when the support swings back in response to the pull exerted by the idler pulley 39. By changing the position of this collar or nut the extent to which the support may swing back can be readily determined. It may be desirable also that the support should be locked in a selected position of adjustment, and for this purpose the block is compressed upon the rod through the medium of a screw or cam device 47 having an operating handle 48, as shown.

A sawing machine constructed in accordance with the preceding description is advantageous in many respects. It is possible to elevate the saw relative to the table by adjusting the height of the cradle through manipulation of the screw shaft 18. The saw may also be oscillated through an arc which is predetermined by adjustment of the nut or collar 46. These movements of the saw may take place regardless of whether or not the table be horizontal or tilted into any of its various positions of adjustment. By the use of suitable gauge blocks, such as are commonly applicable to saw tables, the work may be held fixedly in a desired position for cutting by the saw. It is accordingly possible to adjust the work slantwise across the table when the latter is tilted with the result that the saw will execute a double oblique cut.

The embodiment of my invention as shown and described herein represents a preferred form which, however, may be modified within considerable limits as defined by the claims below.

I claim:

1. A sawing machine having a pivoted frame mounted to swing about a horizontal axis, a support pivoted at its lower end to the frame, a saw mounted for rotation at the upper frame end, a belt connection extending downwardly from the saw and thence laterally to a power source, an idler pulley around which the belt travels at the point where its change in direction occurs, a movable mounting for the pulley carried by the saw support permitting the pulley to utilize gravity forces to adjust itself as required to hold the belt taut irrespective of the position of the frame or saw support, and means acting in opposition to the pulley to sustain the support in a selected position of swinging adjustment, substantially as described.

2. A sawing machine in which is combined a framework, a table thereupon mounted to tilt about a fixed axis from a horizontal to an inclined position, the table being formed with an elongated slot aligned with its axis of tilting, a rotatable circular saw disposed within the table slot, a support whereon the saw is mounted, there being between the framework and the lower end of the saw support a pivotal connection the axis of which is transverse to that of the axis about which the table is tiltable whereby the saw support may be swung to move the saw back and forth lengthwise of the table slot, and driving connections for rotating the saw operable in its various positions of adjustment, substantially as described.

3. In a sawing machine, the combination of a framework on which is a table mounted to tilt about a horizontal axis, there being an elongated slot through the table coincident with the tilting axis thereof, a rotatable circular saw disposed within the table slot, a support for the saw having a pivotal mounting which is disposed horizontally but transverse to that of the table whereby the support may be swung to move the saw back and forth lengthwise of the table slot, and means whereby the mounting for the saw support may be raised or lowered, substantially as described.

4. In a sawing machine, the combination of a framework on which is a table mounted to tilt about a horizontal axis, there being an elongated slot through the table coincident with the tilting axis thereof, a rotatable circular saw disposed within the table slot, a support for the saw having a pivotal mounting which is disposed horizontally but transverse to that of the table whereby the support may be swung to move the saw back and forth lengthwise of the table slot, means whereby the mounting for the saw support may be raised or lowered, and driving connections for rotating the saw operable in its various positions of adjustment, substantially as described.

FRED G. WALKER.